(12) United States Patent
Nelges

(10) Patent No.: US 10,710,347 B2
(45) Date of Patent: Jul. 14, 2020

(54) INSULATING VARNISH AND INSULATION LAMINATE

(71) Applicant: ABB AG, Mannheim (DE)

(72) Inventor: Jörg Nelges, Mosbach (DE)

(73) Assignee: ABB SCHWEIZ AG, Baden (CH)

( * ) Notice: Subject to any disclaimer, the term of this patent is extended or adjusted under 35 U.S.C. 154(b) by 30 days.

(21) Appl. No.: 14/071,374

(22) Filed: Nov. 4, 2013

(65) Prior Publication Data

US 2014/0065391 A1    Mar. 6, 2014

Related U.S. Application Data

(63) Continuation of application No. PCT/EP2012/001501, filed on Apr. 4, 2012.

(30) Foreign Application Priority Data

May 2, 2011 (EP) .................................. 11003554

(51) Int. Cl.
*B32B 27/18* (2006.01)
*B32B 27/12* (2006.01)
(Continued)

(52) U.S. Cl.
CPC ............... *B32B 27/18* (2013.01); *B32B 3/12* (2013.01); *B32B 21/08* (2013.01); *B32B 27/08* (2013.01); *B32B 27/12* (2013.01); *B32B 27/36* (2013.01); *C09D 7/65* (2018.01); *H01B 3/30* (2013.01); *H01B 3/306* (2013.01); *H01B 3/40* (2013.01); *H02K 3/34* (2013.01); *H02K 3/48* (2013.01); *H02K 15/04* (2013.01);
(Continued)

(58) Field of Classification Search
CPC ......... B32B 21/08; B32B 27/08; B32B 27/12; B32B 27/18; B32B 27/36; B32B 3/12; B32B 2255/00; B32B 2255/10; B32B 2255/26; B32B 2307/206; B32B 2307/746; C09D 7/125; H01B 3/30; H01B 3/306; H01B 3/40; H02K 15/04; H02K 3/34; H02K 3/48; Y10T 428/24964; Y10T 428/265; Y10T 428/266
USPC .......................................... 428/212–220, 515
See application file for complete search history.

(56) References Cited

U.S. PATENT DOCUMENTS 1,675,419 A  *  7/1928  Myers .................... H02K 15/12
                                                        156/172
2,508,850 A  *  5/1950  Wirth .................... H02K 3/345
                                                        310/215
(Continued)

FOREIGN PATENT DOCUMENTS

DE   10 2005 050428 A1      4/2007
DE      102005050428 A1 *   4/2007
(Continued)

OTHER PUBLICATIONS

DE 10-2005/050428 A1_Machine Translation (accessed on the web Apr. 1, 2015).*

(Continued)

*Primary Examiner* — Travis M Figg
(74) *Attorney, Agent, or Firm* — Barnes & Thornburg LLP

(57) ABSTRACT

An insulation laminate is disclosed having a base laminate layer, with at least one flat side coated with a layer of an insulating varnish, the insulating varnish including a basecoat; and an added lubricant.

20 Claims, 1 Drawing Sheet

(51) Int. Cl.
  *B32B 21/08*   (2006.01)
  *B32B 3/12*    (2006.01)
  *H02K 3/34*    (2006.01)
  *B32B 27/36*   (2006.01)
  *H02K 3/48*    (2006.01)
  *H02K 15/04*   (2006.01)
  *H01B 3/30*    (2006.01)
  *H01B 3/40*    (2006.01)
  *C09D 7/65*    (2018.01)
  *B32B 27/08*   (2006.01)

(52) U.S. Cl.
  CPC ....... *B32B 2255/00* (2013.01); *B32B 2255/10* (2013.01); *B32B 2255/26* (2013.01); *B32B 2307/206* (2013.01); *B32B 2307/746* (2013.01); *B32B 2457/00* (2013.01); *Y10T 428/24967* (2015.01); *Y10T 428/265* (2015.01); *Y10T 428/266* (2015.01); *Y10T 428/31511* (2015.04); *Y10T 428/31721* (2015.04); *Y10T 442/675* (2015.04)

(56) References Cited

U.S. PATENT DOCUMENTS

| | | | |
|---|---|---|---|
| 3,301,932 A * | 1/1967 | Chisholm | ................ 264/171.21 |
| 4,861,647 A | 8/1989 | Ishikawa et al. | |
| 2007/0180683 A1 * | 8/2007 | Yoshimura | ............... H02K 1/04 29/596 |
| 2008/0286591 A1 * | 11/2008 | Hollberg | ................... B32B 5/26 428/480 |
| 2009/0258207 A1 * | 10/2009 | Miyaji et al. | ................. 428/220 |

FOREIGN PATENT DOCUMENTS

| | | | | |
|---|---|---|---|---|
| JP | 05291059 A | * | 11/1993 | ............. H01F 27/32 |
| JP | 2010-135135 A | | 6/2010 | |
| JP | 2010135135 A | * | 6/2010 | |
| JP | 2010-251134 A | | 11/2010 | |
| JP | 2010251134 A | * | 11/2010 | |
| JP | 2010251134 A | * | 11/2010 | |

OTHER PUBLICATIONS

JP 2010/135135 A_Machine Translation (accessed on the web Apr. 1, 2015).*
JP 2010/251134 A_Machine Translation (accessed on the web Apr. 1, 2015).*
Definition of Flat (accessed on the web Apr. 1, 2015).*
Definition of Laminate.*
JP-2010251134-A Machine Translation (Year: 2010).*
International Search Report (PCT/ISA/210) dated May 8, 2012, by the European Patent Office as the International Searching Authority for International Application No. PCT/EP2012/001501.

* cited by examiner

INSULATING VARNISH AND INSULATION LAMINATE

RELATED APPLICATIONS

This application claims priority as a continuation application under 35 U.S.C. § 120 to PCT/EP2012/001501, which was filed as an International Application on Apr. 4, 2012 designating the U.S., and which claims priority to European Application 11003554.0 filed in Europe on May 2, 2011. The entire contents of these applications are hereby incorporated by reference in their entireties.

FIELD

The present disclosure relates to an insulating varnish and an insulation laminate that has a base laminate layer.

BACKGROUND INFORMATION

It is known that rotating electrical machines or generators can have at least one basic element produced from a laminated core, such as for example a stator, in which a magnetic flux occurring during the operation of this component is guided. Laminated cores are used here for the construction to for example avoid, or at least reduce, eddy currents.

The electrical winding conductors for such components, for example a stator winding, can be guided in winding slots, which are formed as channel-like clearances through respective laminated cores. The winding slots can be lined on their boundary surfaces with a sheet-like insulating material, so that the electrical insulation between the winding and the laminated core is increased. Single- or multi-ply flexible insulating sheetings (IEC 60626-3) are used as insulating materials. These flexible insulating materials may be additionally used with coatings for adhesive bonding to the laminated core or with coatings for increasing the aging resistance (IEC 60626-3 Sheet 502ff) at elevated temperature.

In the production of such machines or generators, therefore, the respective laminated core or further components first have to be produced, then the respective winding conductor is pulled into the slots. Especially in the case of smaller machines, for example in the case of motors in the power range from <1 kW to 10 kW and above, when it is introduced into the respective winding slots a winding conductor is at least partially pulled through them.

However, known insulating sheetings described in the standard have a material-dependent surface roughness, which in the case of automated processing represents a factor limiting the production rate. In the case of automated production, the slot cell can be first insulated and then the winding is pulled in together with a slot seal. As this happens, on the one hand the winding rubs against the slot cell insulation and on the other hand the slot cell insulation rubs against the slot seal. Depending on the COF (Coefficient of Friction) of the elements undergoing friction, damage to the insulation may occur, or the pulling in of the insulation is prevented.

SUMMARY

An insulation laminate is disclosed having a base laminate layer, with at least one flat side coated with a layer of an insulating varnish, the insulating varnish comprising: a basecoat; and an added lubricant.

BRIEF DESCRIPTION OF THE DRAWINGS

Exemplary advantages of features disclosed herein will be explained in connection with the insulation laminate disclosed herein.

Further embodiments and further advantages are to be described in more detail on the basis of exemplary embodiments that are represented in the drawings, in which.

DETAILED DESCRIPTION

Figure 1:
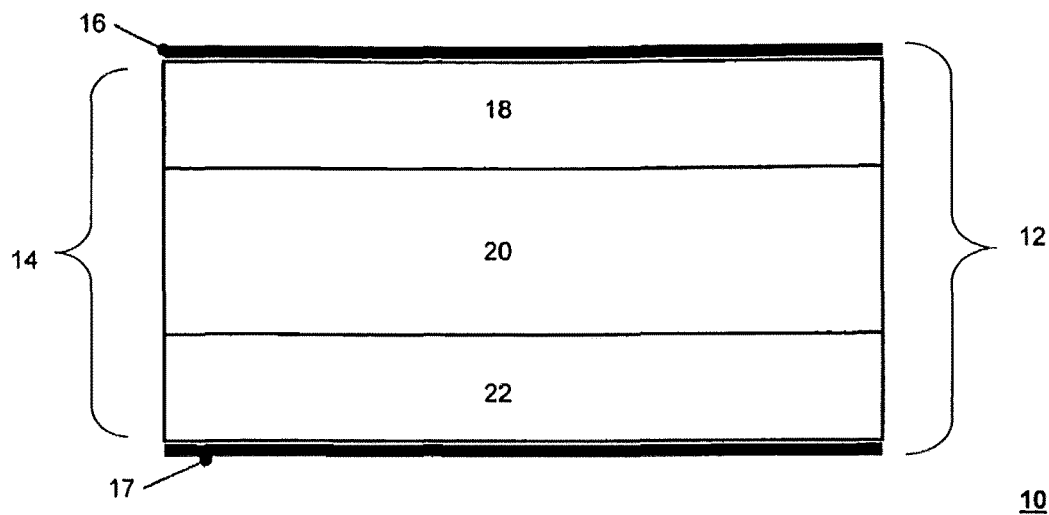
FIG. 1 shows a section through an exemplary insulation laminate.

An insulating sheeting or materials therefor are disclosed by which the previously described friction effects can be reduced.

For example, an insulating varnish of the type already mentioned is disclosed which is characterized by a main basecoat component and an added lubricant. For example, insulating sheetings are coated at least on one side, or on both sides with a basecoat, which serves for improving the aging resistance. However, this basecoat can also contribute to a considerable extent to the frictional characteristics along the surface of the insulating sheeting. As disclosed herein, adding a lubricant to the basecoat produces an insulating varnish, which after being applied to the insulating sheeting and cured, can improve frictional characteristics, for example on account of being given the form of a two-component varnish.

According to an exemplary embodiment of an insulating varnish disclosed herein, the basecoat is a polyester-imide or epoxy varnish. As disclosed herein, such varnishes have proven successful for the coating of insulating sheetings even without any added material, though with frictional behavior that could be improved. Such varnishes are for example made up as a 2-component material, using for example a stock varnish and a hardener, which are mixed together shortly before being applied and then cured.

According to a further exemplary embodiment of an insulating varnish disclosed herein, an amide wax dispersion is used as the added lubricant in a proportion by weight of 2% to 25% of the insulating varnish, with for example a lower range from 2% to 10% being preferred. This is so because it has been found that even relatively small amounts of the addition can be sufficient for achieving desired effects disclosed herein. For example, the basecoat and the added lubricant make up 100%.

The present disclosure is also directed to an insulation laminate that has a base laminate layer which is coated at least on one of its flat sides with a layer of an insulating varnish as disclosed herein. This varnish is for example ideally cured, because this can bring out best the frictional properties of the surface of the insulation laminate.

This is so because the lubricant disclosed herein can include an amide wax dispersion, having a property that at room temperature it accumulates on the surface of the dried insulating varnish layer and at temperatures greater than 60° C. it migrates away from the surface, that is to say withdraws into the interior of the dried insulating varnish layer. On the one hand, this can have an advantage that, when a winding conductor is introduced into the winding slots that are lined with an insulation laminate as disclosed herein, an extremely smooth surface is provided, which is conducive to sliding when the winding conductor is pulled in. This is so because, according to exemplary embodiments disclosed herein, the introduction of winding conductors is performed at room temperature, that is to say for example in a temperature range of approximately 15° C. to 30° C., preferably such as at about 20° C.

On the other hand, however, such a sliding layer can be disadvantageous for an encapsulation of the pulled-in winding conductor which is for example to be carried out thereafter, if this is likewise performed at room temperature. Encapsulation is intended to finally stabilize the winding or the winding conductor, in order to achieve a high degree of robustness of the end product, for example of the motor. Such a sliding layer would therefore be counter to the aim of an encapsulation, because a bonding of the encapsulating compound to the winding conductor would be considerably reduced.

However, such an encapsulation is not for example performed under room temperature conditions, but either with a hot encapsulating compound or while the component concerned is heated to a drying temperature of the encapsulating compound, for example 110° C. In this case, the temperature causes the sliding layer to migrate into the interior of the varnish layer and the encapsulating compound can enter into a connection actuated by adherence with the winding or the winding conductor during the curing of the compound. This can for example advantageously ensure stabilization of the winding by the encapsulating compound.

If an encapsulating compound that does not require an elevated temperature during processing or for curing is chosen, it should then be correspondingly heated. This can either be performed directly, or can be performed indirectly by heating the winding, for example also by temporarily applying a short-circuiting current to the electrically operational winding.

It has been found that an average thickness of the insulating varnish layer in an exemplary range from 2 μm to 15 μm proves to be particularly favorable with respect to the sliding and/or insulating properties thereby achieved. In relation to this, exemplary layer thicknesses of a base laminate layer lie in an exemplary range from 90 μm to 800 μm. The lower layer thickness range of the base laminate layer can be limited by an inadequate mechanical stability of the insulation laminate, and the upper layer thickness range can be limited by an inadequate mechanical flexibility of the insulation laminate, no longer allowing it to be unproblematically laid in a winding slot.

According to further exemplary embodiments, the following base laminates, which have already been used for a comparable purpose without the added lubricant disclosed herein have proven to be particularly suitable for being used as a base laminate material for an insulation laminate as disclosed herein:

pressboard/PET film laminate,
PET film/PET nonwoven laminate,
NOMEX/PET film laminate,
NOMEX/polyimide film laminate.

NOMEX is a name for aramid paper that is familiar to those skilled in the art. Such laminates are for example multi-layered and symmetrical in terms of the layer structure, for example with 2 or 3 or more layers. In the case of the aforementioned combinations, there is inter alia particularly good bonding of the insulating varnish disclosed herein to the surface of the base laminate. It should be mentioned in this connection that the base varnish material is, for example, a 2-component material, so that a lower temperature is used for its curing and the sliding layer accumulates on the surface of the varnish layer during the drying phase of the insulating varnish as disclosed herein.

Methods for introducing a winding into at least one winding slot of a stator or rotor are also disclosed and can include:
  lining the at least one winding slot with an insulation laminate as disclosed herein
  pulling a winding conductor into the at least one winding slot under room temperature conditions
  encapsulating the winding conductor in the at least one winding slot at an elevated temperature.

FIG. 1 shows a section 10 through an exemplary insulation laminate 12 as disclosed herein, which includes a three-layered base laminate 14 and a coating on both sides with an insulating varnish layer 16, 17 with added lubricant. The layer thicknesses of the insulating varnish layers 16, 17 are in this case each for example approximately 5 μm. The base laminate can include a middle laminate layer 20 with a layer thickness of approximately 200 μm having a PET nonwoven laminate. The two outer laminate layers 18, 22 are produced from a PET nonwoven and have an exemplary layer thickness of 50 μm each.

Figure 2:
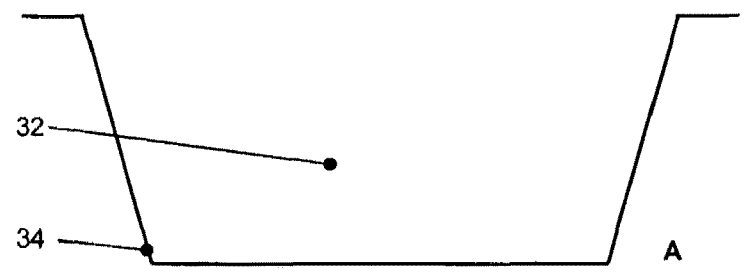
FIG. 2 shows exemplary working steps A, B, C when introducing a winding conductor.
Figure 2:
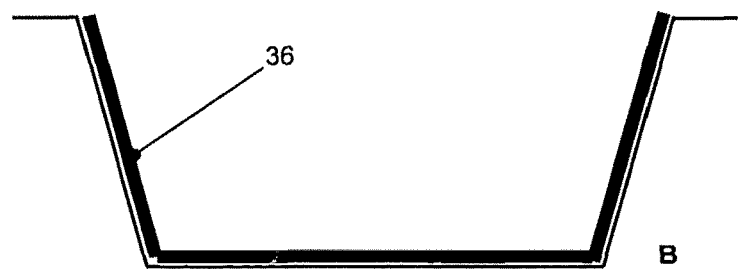
Figure 2:
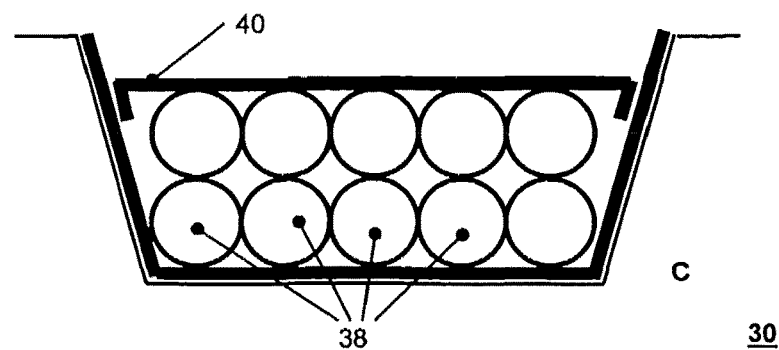

FIG. 2 shows exemplary working steps A, B, C when introducing a winding conductor into a winding slot in an elevation 30. The first illustration 30A shows a winding slot 32, which has been let into a laminated core of a stator of a motor, as indicated by its boundary surfaces 34. Depending on the size and power of the motor, the depth of the winding slot is, for example, 1 cm to 3 cm, for motors of a relatively small size, for example for power drills or vacuum cleaners. The width of the slot lies, for example, in a range from 0.5 cm to 6 cm. However, it goes without saying that significantly larger motors or generators, with correspondingly different slot dimensions, are also possible and envisaged The illustration 30B illustrates a folded insulation laminate 36 as disclosed herein which has a thickness of for example approximately 200 μm and has been placed in the winding slot. In the case of the low motor power, and consequently also motor voltage, assumed in this example, this is absolutely sufficient for the electrical insulation of an assumed exemplary maximum 1 kV.

The illustration 30C additionally indicates a placed-in winding wire 38, the conductor cross section absolutely not being to scale; rather, a much greater number of windings of the winding conductor 38, with a correspondingly smaller cross section, should be expected. The winding formed by the winding conductor 38 extends at least also over a further winding slot that lies symmetrically opposite and is not shown. The winding slot or the slot cell can be covered with a slot seal 40, likewise having an insulation laminate as disclosed herein, but this has a slightly increased layer thickness for mechanical reasons. It can be assumed that the winding is encapsulated in exemplary embodiments, so that the slot cell with the winding conductor 38 arranged therein is filled with an encapsulating compound (not represented), by which the winding is secured.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 section through an exemplary insulation laminate
12 insulation laminate 14 base laminate layer
16 first insulating varnish layer
17 second insulating varnish layer
18 first layer of the base laminate
20 second layer of the base laminate
22 third layer of the base laminate
30 working steps A, B, C when introducing a winding conductor
32 interior space of an exemplary winding slot
34 boundary surface of an exemplary winding slot
36 insulation laminate
38 winding conductor
40 slot seal

The invention claimed is:

1. A folded insulation laminate comprising:
a base laminate comprising pressboard and having at least one side coated with a layer of an insulating varnish, the insulating varnish comprising a basecoat and an added lubricant;
wherein the basecoat is a polyester-imide or epoxy varnish, the added lubricant is an amide wax dispersion in a proportion by weight of 2% to 25%, the insulating varnish is cured, and an average thickness of the insulating varnish layer lies in a range from 2 µm to 15 µm; and
wherein the folded insulation laminate includes a number of sections shaped complimentary to boundary surfaces of a winding slot of a motor to define a receptacle having an open outer side to receive a winding.

2. The folded insulation laminate as claimed in claim 1, the base laminate further comprising PET film.

3. The folded insulation laminate as claimed in claim 1, wherein the number of sections includes a first section shaped to correspond with a first of the boundary surfaces of the winding slot, a second section shaped to correspond with a second of the boundary surfaces of the winding slot, and a fold defined between the first and second sections.

4. The folded insulation laminate as claimed in claim 3, wherein the first section of the folded insulation laminate is angled relative to the second section.

5. The folded insulation laminate as claimed in claim 4, wherein the number of sections includes a third section shaped to correspond with a third of the boundary surfaces of the winding slot and another fold defined between the second and third sections.

6. The folded insulation laminate as claimed in claim 5, wherein the third section of the folded insulation laminate is angled relative to the second section.

7. An assembly of insulation laminate comprising:
a folded insulation laminate as claimed in claim 1, and
a slot seal arranged complimentary with the number of sections to extend across the receptacle at the open outer side to cover the receptacle.

8. The assembly as claimed in claim 7, wherein the slot seal includes a seal laminate layer with at least one side coated with a layer of the insulating varnish.

9. The assembly as claimed in claim 8, wherein the layer of the insulating varnish on the at least one side of the seal laminate layer is thicker than the at least one layer of insulating varnish on the base laminate.

10. The folded insulation laminate as claimed in claim 1, wherein the base laminate includes a second side, opposite the at least one side, the second side being coated with the insulating varnish.

11. The folded insulation laminate as claimed in claim 2, wherein the base laminate includes a middle layer comprising the pressboard and a first outer layer comprising PET film.

12. The folded insulation laminate as claimed in claim 11, wherein the base laminate includes a second outer layer comprising PET film arranged opposite the first outer layer.

13. The folded insulation laminate as claimed in claim 12, wherein the first outer layer forms the at least one side coated with the layer of the insulating varnish, and the second outer layer forms another side coated with a layer of the insulating varnish.

14. The folded insulation laminate as claimed in claim 1, wherein an average thickness of the base laminate lies in a range from 80 µm to 1000 µm.

15. The folded insulation laminate as claimed in claim 1, wherein the base laminate includes an opposite side coated with a layer of the insulating varnish.

16. A winding slot of a motor comprising:
a folded insulation laminate having a number of sections shaped complimentary to boundary surfaces of the winding slot to define a receptacle having an open outer side to receive a winding, the folded insulation laminate comprising a base laminate comprising pressboard, the base laminate having at least one side coated with a layer of insulating varnish, the insulating varnish comprising:
a basecoat including a polyester-imide or epoxy varnish; and
an added lubricant including an amide wax dispersion in a proportion by weight of 2% to 25%;
wherein the insulating varnish is cured and an average thickness of the insulating varnish layer lies in a range from 2 µm to 15 µm.

17. A motor comprising:
a winding slot including a winding of the motor received therein; and
a folded insulation laminate having a number of sections shaped complimentary to boundary surfaces of the winding slot, the folded insulation laminate comprising a base laminate comprising pressboard, the base laminate having at least one side coated with a layer of insulating varnish, the insulating varnish comprising:
a basecoat including a polyester-imide or epoxy varnish; and
an added lubricant including an amide wax dispersion in a proportion by weight of greater than 20% up to 25%;
wherein the insulating varnish is cured and an average thickness of the insulating varnish layer lies in a range from 2 µm to 15 µm.

18. The folded insulation laminate as claimed in claim 5, wherein the first and third sections each include (i) a free end and (ii) an opposite end connected with second section, the free ends of the first and third sections defining the open outer side of the receptacle therebetween.

19. The assembly as claimed in claim 7, wherein the slot seal includes a seal laminate layer with at least one side coated with a layer of the insulating varnish.

20. The assembly as claimed in claim 19, wherein the layer of the insulating varnish on the at least one side of the seal laminate layer is thicker than the at least one layer of insulating varnish on the base laminate.

* * * * *